Figure 1:
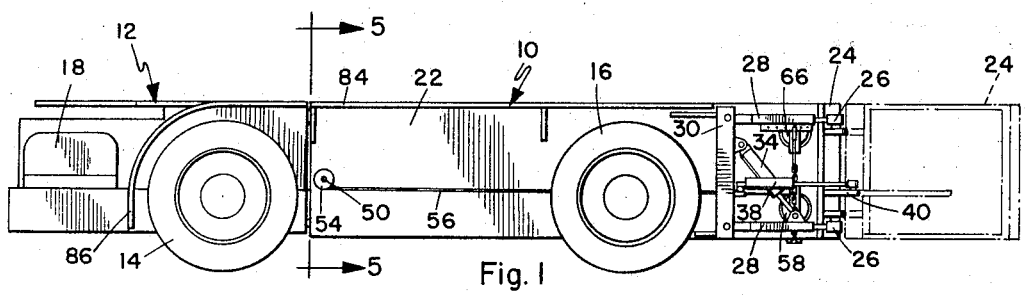

June 20, 1967 M. A. WILLIAMS ET AL 3,326,395

MATERIAL HANDLING TRUCK

Filed Aug. 6, 1965 2 Sheets-Sheet 1

INVENTORS
MELVIN A. WILLIAMS
JOHN D. WILLIAMS
BY
Knox & Knox

June 20, 1967  M. A. WILLIAMS ET AL  3,326,395

MATERIAL HANDLING TRUCK

Filed Aug. 6, 1965  2 Sheets-Sheet 2

INVENTORS
MELVIN A. WILLIAMS
JOHN D. WILLIAMS
BY
Knox & Knox

United States Patent Office 3,326,395
Patented June 20, 1967

1

3,326,395
MATERIAL HANDLING TRUCK
Melvin A. Williams, 8631 Harness St., and John D.
Williams, 8670 Valencia St., both of Spring Valley, Calif. 92077
Filed Aug. 6, 1965, Ser. No. 477,890
4 Claims. (Cl. 214—82)

The present invention relates to vehicles and more specifically to a material handling truck.

The primary object of this invention is to provide a material handling truck which is self-loading, can be closed to carry the material to any destination and is self-emptying, the truck being adapted to handling a variety of materials, but being especially suitable for removing manure from large chicken houses in which the cages are suspended in rows from overhead. In this type of chicken house the height of the cages at a convenient access position is such that the clearance under the cages is insufficient for conventional scoop or scraper type material removal devices.

Another object of this invention is to provide a material handling vehicle having a low slung load box of very large capacity for the size of the vehicle, making it possible to pick up a full load from the ground or floor surface.

Another object of this invention is to provide a material handling truck having an adjustable pick-up blade and gates, incorporated in the load box structure, which cooperate to form a material collecting scoop, allowing the vehicle to be driven directly into the material to be picked up.

A further object of this invention is to provide a material handling truck which is easily controlled by a single operator from a driving position at one side of the truck, which facilitates maneuvering of the vehicle in any direction and allows the vehicle to travel under low clearance structures.

Figure 2:
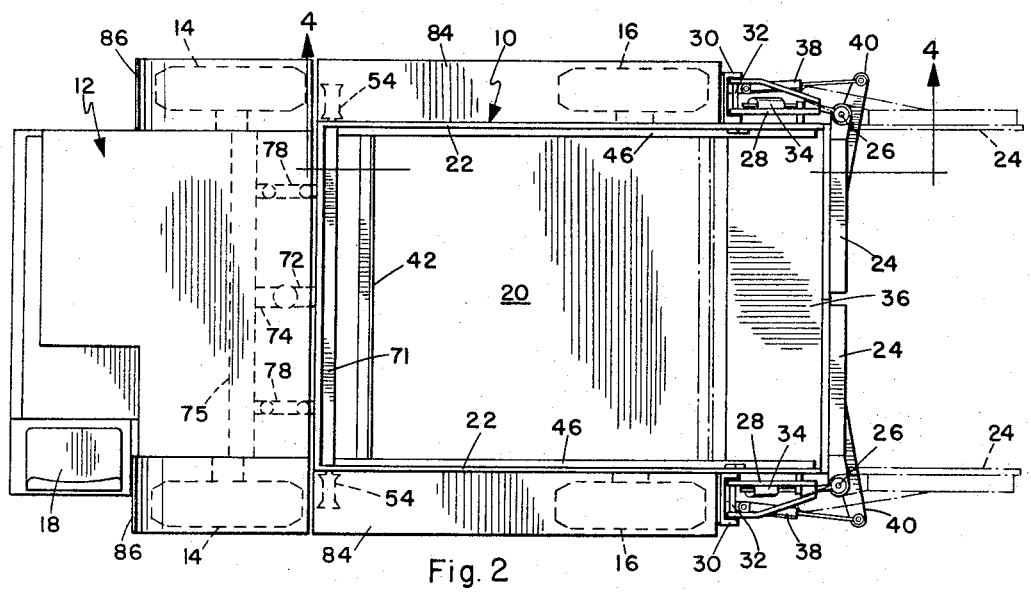
Figure 3:
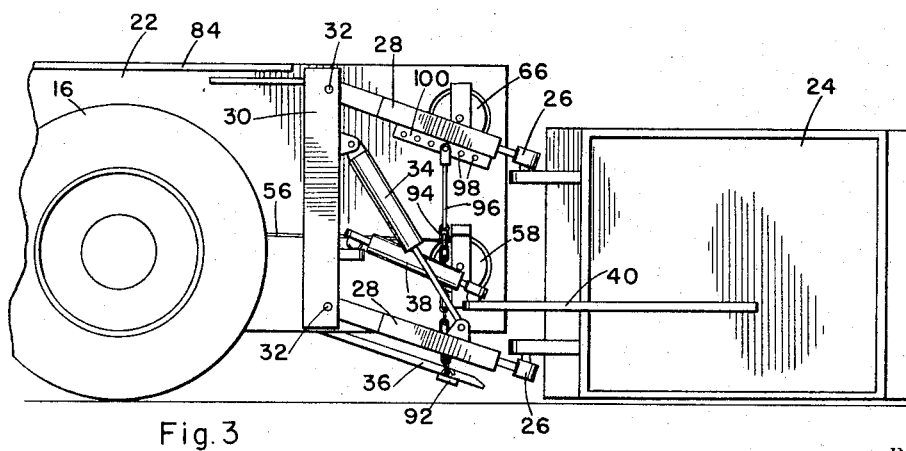
Figure 4:
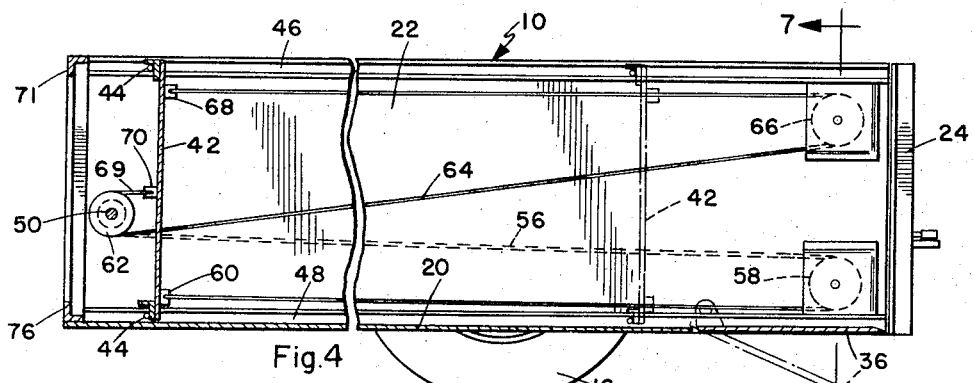
Figure 5:
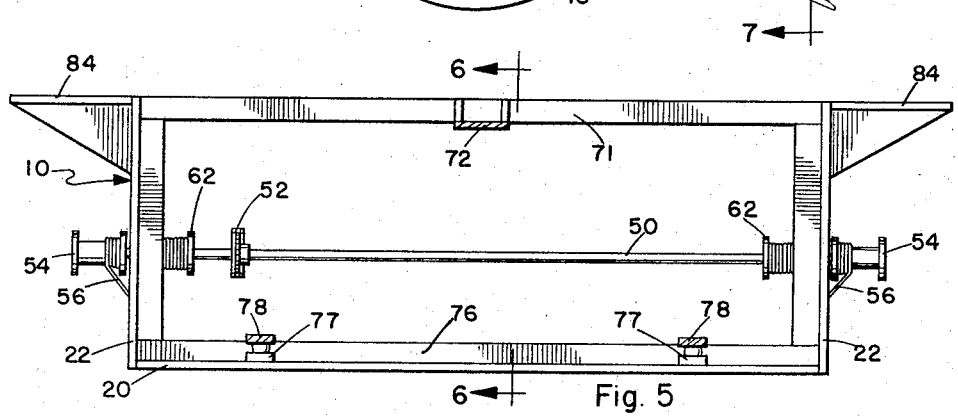
Figure 6:
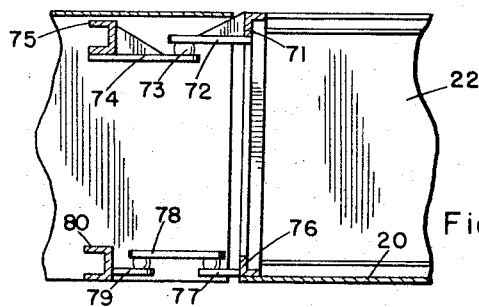
Figure 7:
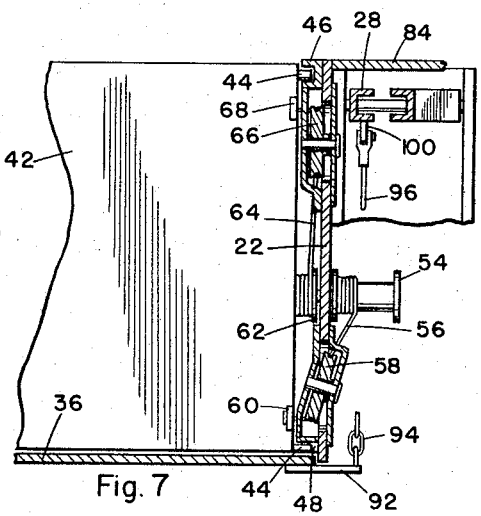
Figure 8:
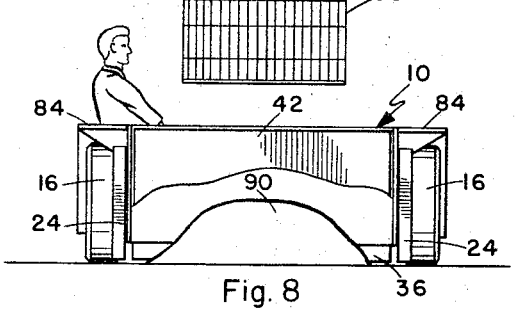

The vehicle structure and its operation are illustrated in the drawings, in which;

FIGURE 1 is a side elevation view of the truck;
FIGURE 2 is a top plan view thereof;
FIGURE 3 is an enlarged side elevation view of the material pick-up assembly in operation position;
FIGURE 4 is an enlarged sectional view taken on line 4—4 of FIGURE 2;
FIGURE 5 is an enlarged sectional view taken on line 5—5 of FIGURE 1;
FIGURE 6 is a sectional view taken on line 6—6 of FIGURE 5;
FIGURE 7 is a sectional view taken on line 7—7 of FIGURE 4;
FIGURE 8 is a diagrammatic view showing a typical use of the vehicle.

Similar characters of reference indicate similar or identical elements and portions throughout the specification and throughout the views of the drawing.

The vehicle is constructed around a load box 10 with a drive unit 12 at one end, the drive unit having a pair of steerable driven wheels 14 and the box carrying a pair of freely rotatable supporting wheels 16 mounted closely against the sides to minimize width. The drive unit can utilize any suitable engine and control mechanisms, as in similar types of vehicles, and unnecessary detail in this respect has been omitted. An operator's seat 18 is provided at one side of the drive unit 12, the operator facing in toward the center of the vehicle and having good vision for forward or reverse motion without turning, the operator's head and body being kept clear of obstructions under which the vehicle is run.

The vehicle is low slung and has its overall height kept

2 to a minimum commensurate with a reasonable load capacity in the box portion.

The box 10 has a flat floor 20 and upright longitudinal sides 22, the rear end of the box being closed by a pair of gates 24 pivotally mounted on hinges 26 to swing outwardly into generally parallel alignment with said sides. Hinges 26 are carried on vertically spaced parallel arms 28 which extend rearwardly from brackets 30 fixed near the rear ends of sides 22, the parallel arms being mounted on transverse hinge pins 32 to swing in vertical planes. On each side a jack 34, or similar linear actuator, is connected between the bracket 30 and one parallel arm 28, so that gates 24 can be raised or lowered. The rear portion of floor 20 comprises a blade 36 which is hinged at its forward transverse edge adjacent to or on the hinge pins 32 of the lower parallel arms 28, to swing downwardly when the gates 24 are lowered, as in FIGURE 3.

Blade 36 is not rigidly coupled to move with gates 24 but is provided with adjustment means for variation of the relative motions. Projecting from each side of blade 36 is a lug 92 to which is connected an adjustable link 94, such as a chain, one end of which can be attached to the lug at selected positions. At the other end of link 94 is a connecting link 96 which is engageable in any one of a series of holes 98 spaced along a connecting plate 100 fixed to the upper arm 28. When the connecting link 96 is secured in the hole 98 vertically above lug 92, with the arms 28 in raised position, the resulting parallel linkage will provide equal motion of the blade 36 and gates 24. If the connecting link is used in another hole the ratio of movement of blade 36 relative to the gates will be changed. This allows for adjustment of the clearance of the blade pick-up edge above the ground when the gates are fully lowered and avoids the necessity for careful positioning of the gates at each use to obtain the required clearance. The gates 24 are opened and closed by jacks 38, or the like, one jack being mounted on each side between bracket 30 and a hinge arm 40 extending outwardly from the gate.

The forward wall of the box 10 is formed by an upright ejection plate 42 having guides 44 at the corners which are slidable in longitudinal upper and lower tracks 46 and 48, respectively, substantially the full length of the box. Ejection plate 42 can be actuated by various means, a cable system being shown as an example. A cross shaft 50 is mounted at the forward end of box 10 and rotated by a chain drive 52, or similar connection, from drive unit 12. On each outer end of cross shaft 50 is a drum 54 on which is wound an ejection cable 56, said cable passing outside the box 10, around a pulley 58 inset in the lower rear portion of the side 22 and back along the inside of the box to a lug 60 on the lower corner of ejection plate 42. A second drum 62 is fixed at each end of cross shaft 50 inside the side 22, an ejection cable 64 extending from this drum, around a pulley 66 inset in the rear upper portion of the side, and back to a lug 68 near the top of the ejection plate 42. A return cable 69 is connected from a lug 70 back to each drum 62 and wound thereon in the opposite direction to cable 64.

To avoid distortion of the box and possible jamming of the mechanism due to operating the vehicle on uneven ground, a pivotal connection is provided between the box and the drive unit. Extending from the center of the top frame member 71 of box 10 is a bracket 72, which is coupled by a ball joint 73 to a corresponding bracket 74 on the frame structure 75 of drive unit 12. On the lower frame member 76 of box 10 are laterally spaced brackets 77 connected by universal links 78 to brackets 79 on frame structure 80 of the drive unit 12. The two portions of the vehicle can thus twist relative to each other about the longitudinal axis to follow an undulating surface, while maintaining directional rigidity of connection necessary for steering and support. The specific structural arrangement and materials used in the vehicle are not critical, the configuration shown being representative.

Along the upper edges of sides 22 are secured laterally extending fenders 84, which reinforce the box and cover the wheels, the forward extensions 86 of the fenders on drive unit 12 being turned down around driven wheels 14 to protect the operator.

One operation for which the vehicle is particularly effective is illustrated in FIGURE 8. In a large egg producing facility the chickens are housed in cages 88 suspended from overhead structure at an accessible height, usually from 32 to 40 inches above the floor. The manure accumulates in the form of a ridge 90 under each row of cages and must be removed periodically.

The vehicle's rear gates 24 are opened and lowered as in FIGURE 3, the blade 36 also being lowered to bring the rear edge close to the floor surface. Starting at one end of a row of cages the vehicle is driven directly along the row, the blade 36 picking up the material from the ridge 90 and the gates 24 guiding the material into box 10. With the ejection plate 42 in the forward position the box can be completely filled in a continuous pass. Gates 24 are then raised, which raises blade 36 to form the rear portion of the box floor, and the gates are closed. The vehicle can then be driven to a convenient location for dumping the load, which is accomplished by opening the gates and operating the cable system to move ejection plate 42 rearwardly, as indicated in the broken line position in FIGURE 4. The box is completely emptied in one motion of the ejection plate and the vehicle is ready for refilling.

Many different loose materials can be handled in this manner, such as in earth moving, mining and similar operations. The position of the operator, facing sideways, facilitates driving the vehicle in either direction without excessive head or body turning, while providing a clear view of the loading and unloading operation.

It is understood that minor variation from the form of the invention disclosed herein may be made without departure from the spirit and scope of the invention, and that the specification and drawings are to be considered as merely illustrative rather than limiting.

We claim:
1. A material handling truck, comprising:
   a wheeled, substantially rectangular load carrying box having a wheeled drive unit at one end thereof;
   the other end of said box having gate means forming an end wall of the box and hinged to swing horizontally between open and closed positions;
   said box having a floor with the portion thereof adjacent said gate means hinged to swing downwardly and comprise a material pick-up blade;
   an ejection plate in said box constituting another end wall thereof and being movable axially longitudinally of the box to eject material from the box;
   and means to raise and lower said gate means in the open position thereof, along with said blade, relative to said box.

2. A material handling truck according to claim 1, wherein said box and said drive unit have a pivotal interconnection rotatable about an axis substantially parallel to the longitudinal axis of the truck so that the drive unit maintains proper traction when the truck is operated on uneven ground surfaces.

3. A material handling truck comprising:
   a wheeled, substantially rectangular load carrying box having a floor and upright longitudinal sides;
   a wheeled drive unit connected to one end of said box;
   the other end of said box having pivoted arm means and gates hinged to said arm means and forming an end wall in closed position and being mounted to swing outwardly into substantially parallel alignment with the sides;
   the portion of said floor adjacent said gates comprising a material pick-up blade and being hinged to swing downwardly;
   means to lower said gates, in the open position, together with said blade to form a material collecting scoop therewith; and
   linkage means interconnecting said blade and said gates, said linkage means being connected between said arm means and said gates and adjustable to vary the relative motion of the blade and gates.

4. A material handling truck according to claim 3 and including an injection plate comprising another end wall of said box, and means to move said ejection plate longitudinally within said box including power driven drums and cables operated by said drums and terminally secured to upper and lower portions of said ejection plate so as to stabilize said ejection plate in a vertical position as it is moved by said cables.

References Cited

UNITED STATES PATENTS

| | | | |
|---|---|---|---|
| 2,298,982 | 10/1942 | Smith | 214—82 |
| 2,556,592 | 6/1951 | Markkula. | |
| 2,609,116 | 9/1952 | Beck | 214—83.36 |
| 3,115,258 | 12/1963 | Shackley | 214—82 |

GERALD M. FORLENZA, *Primary Examiner.*

ROBERT G. SHERIDAN, *Examiner.*